US011166220B2

United States Patent
Ziv et al.

(10) Patent No.: US 11,166,220 B2
(45) Date of Patent: Nov. 2, 2021

(54) NEXT-HOP ROUTING OVER A PLURALITY OF DISTINCT CHANNELS IN A MESH NETWORK

(71) Applicants: Pinchas Ziv, Rosh Haain (IL); Reuven Cohen, Rosh Haain (IL); Eran Ben-Shmuel, Rosh Haain (IL); Alexander Bilchinsky, Rosh Haain (IL)

(72) Inventors: Pinchas Ziv, Rosh Haain (IL); Reuven Cohen, Rosh Haain (IL); Eran Ben-Shmuel, Rosh Haain (IL); Alexander Bilchinsky, Rosh Haain (IL)

(73) Assignee: JUGANU, LTD., Rosh Haain (IL)

( * ) Notice: Subject to any disclaimer, the term of this patent is extended or adjusted under 35 U.S.C. 154(b) by 40 days.

(21) Appl. No.: 16/678,256

(22) Filed: Nov. 8, 2019

(65) Prior Publication Data

US 2020/0162993 A1    May 21, 2020

Related U.S. Application Data

(60) Provisional application No. 62/757,183, filed on Nov. 8, 2018.

(51) Int. Cl.
*H04L 12/66* (2006.01)
*H04W 40/24* (2009.01)
*H04L 12/44* (2006.01)

(52) U.S. Cl.
CPC ........... *H04W 40/244* (2013.01); *H04L 12/44* (2013.01)

(58) Field of Classification Search
CPC ... H04W 40/244; H04W 72/04; H04W 40/00; H04W 4/00; H04W 84/22; H04W 84/00; H04L 12/28; H04L 12/18; H04L 12/44; H04L 45/16; H04L 12/56
See application file for complete search history.

(56) References Cited

U.S. PATENT DOCUMENTS

| | | |
|---|---|---|
| 7,590,116 B2 | 9/2009 | He et al. |
| 8,009,671 B2 | 8/2011 | Dong et al. |
| 8,289,883 B2 | 10/2012 | Ngo et al. |
| 9,497,034 B2 | 11/2016 | Chen et al. |
| 2004/0010616 A1 | 1/2004 | McCanne |
| 2008/0095163 A1* | 4/2008 | Chen ................. H04L 45/16 370/392 |

(Continued)

OTHER PUBLICATIONS

International Search Report and Written Opinion Corresponding to International Application No. PCT/IB2019/001244 dated Mar. 23, 2020, 15 pages.

*Primary Examiner* — Abdelnabi O Musa
(74) *Attorney, Agent, or Firm* — Morgan, Lewis & Bockius LLP

(57) ABSTRACT

To promote efficient and reliable communication of beacons among neighboring nodes in a wireless network, instead of having each node transmit beacons over its operational channel and switch to a different channel to receive its one-hop neighbors' beacons, nodes may transmit beacons over a different channel (i.e., different from the operational channel) and receive beacons over their operational channels. These outgoing "visitor beacons" may contain the usual beacon information but most importantly specify the operating channel of the transmitting node over which conventional beacons may be transmitted and received.

14 Claims, 2 Drawing Sheets

(56) References Cited

U.S. PATENT DOCUMENTS

| | | | | |
|---|---|---|---|---|
| 2009/0059851 A1* | 3/2009 | Weil | .................. | H04W 16/10 |
| | | | | 370/329 |
| 2010/0284334 A1* | 11/2010 | Shin | .................. | H04W 48/16 |
| | | | | 370/328 |
| 2010/0296493 A1* | 11/2010 | Lee | .................. | H04B 1/7143 |
| | | | | 370/336 |
| 2011/0228742 A1* | 9/2011 | Honkasalo | .......... | H04L 27/2601 |
| | | | | 370/330 |

\* cited by examiner

NEXT-HOP ROUTING OVER A PLURALITY OF DISTINCT CHANNELS IN A MESH NETWORK

CROSS-REFERENCE TO RELATED APPLICATION

This application claims priority to and the benefit of U.S. Provisional Application No. 62/757,183, filed on Nov. 8, 2018, the entire disclosure of which is hereby incorporated by reference.

TECHNICAL FIELD

The present invention relates generally to tree-based wireless networks, and in various embodiments more specifically to efficient routing in such networks.

BACKGROUND

Recent developments of Internet and mobile communication technologies provide diverse multimedia services, which may be provided almost instantaneously over vast distances. The proliferation of compact portable electronic devices such as notebook computers, mobile phones and smart devices have necessitated deployment of such services, which tend to be very data-intensive, over wireless networks.

One commonly used wireless network has a tree-based structure. This network architecture is often deployed in device networks organized or governed by controllers. For example, tree-based wireless networks are often used when a controller controls a group of network members (or "nodes"); each group member will be reachable via a path across the wireless tree, enabling a point-to-multipoint communication (P2MP) (such as from the controller to the nodes) and multipoint-to-point communication (MP2P) (such as from the nodes to the controller). Common applications include controlled lighting systems, city-wide automatic meter-reading system etc.

Typically, a network group includes a collection of network nodes that share a certain capability, and a network node may belong to more than one group. For example, the first network group may include all network nodes equipped with sensors for measuring air quality near the nodes, and the second group may include network nodes equipped with streetlight controllers of a specific type. A network node equipped with both the air-quality sensor and the particular streetlight controller may thus belong to both the first and second groups.

The wireless network may use various random-access algorithms to access the wireless channels. For example, a carrier-sense multiple access with collision avoidance (CSMA/CA) algorithm may be used to access a radio channel for packet delivery (in accordance with, e.g., the IEEE 802.15.4 and 802.11 standards). Generally, the heavier the load on the channel, the more challenging it will be to "acquire" the channel for packet delivery, thereby increasing communication delay and reducing the throughput performance of the wireless network. In addition, the spurious energy from the heavily used channel may "leak" to the adjacent channels and reduce their signal-to-noise ratio, thereby degrading performance. Thus, it is desirable to minimize the load on wireless channels as well as the number of wireless transmissions in order to keep the channels as "clean" as possible. As used herein, the term "channel" is understood as follows. Each node broadcasts within an assigned frequency band of the radio spectrum. Within its assigned band, a node sends and receives data over a smaller band or over a selected one of several smaller bands; each of these smaller bands represents a separate "channel."

The tree or other network topology over which nodes wirelessly communicate may change dynamically in response to the entry or departure of nodes and changing conditions and constraints. The wireless capabilities of individual nodes may be affected by factors such as effective transmission power, receiver sensitivity, radio interference, hidden terminals, and other factors. Since the wireless environment is constantly changing, so may the route from a source node to a destination node (i.e., the sequence of intermediate nodes, or "hops," traversed by packets transmitted by the source node en route to the destination node). That route is determined by the routing protocol used by the network; examples include RPL (which uses a DODAG topology and IPv6 for control messages) and Zigbee (which is AODV-based and uses IEEE 802.15.4 MAC for network control messages).

In general, the routing protocol does not dictate the algorithm used to determine the multi-hop node sequence that a packet will traverse to its destination. The protocol does, however, enable the network nodes to exchange information regarding capabilities and utilization. This allows network nodes to be updated with information about neighboring nodes and their ability to serve as a next hop along a route from source to destination. In one commonly implemented scheme, each node periodically transmits a "beacon" message announcing its capabilities as well as its own neighboring nodes or, in some cases, its internal representation of the network or portion thereof. Beacon messages (or frames) announce the entry of new network nodes, synchronize the nodes, and allow nodes to populate routing tables and make routing decisions based on the capabilities of neighboring nodes. A beacon message may consist of an IEEE 802.11 MAC header, a body, and a frame check sequence. The body includes capability information for the node, e.g., service set ID, support rates, a frequency-hopping parameter set, a direct-sequence parameter set, a contention-free parameter set, an IBSS parameter set, and/or a current traffic-indication map.

Beacon messages are received by all nodes within "radio distance" of the announcing node, i.e., nodes that can receive direct transmissions from the announcing node and are therefore one-hop neighbors thereof. In order to receive a beacon message, a one-hop neighbor of the announcing node must tune its radio receiver to the radio channel over which the beacon was transmitted. This requirement is easily satisfied if all nodes are use the same channel, but to increase the overall network throughput, radio networks usually use multiple orthogonal (independent) channels. As a result, a beacon will not be received by any one-hop neighbor tuned to a different radio channel during beacon transmission.

One way to allow nodes to receive beacon announcements in a multi-channel wireless network is to equip each node with two sets of radio receivers. Every node can use one receiver for routine communication over its currently assigned channel and the other receiver to handle beacons. The need for redundant hardware and attendant software is expensive, however. Accordingly, a more common scheme is for a node with a single receiver to temporarily "hold" its activities on its current communication channel and request one-hop neighbors to hold their traffic to the announcing node as well. During the hold, the requesting node switches its receiver to another channel for a certain interval in order to receive beacons over the other channel by one-hop neighbors. This procedure is termed "hold and sniff." Because normal traffic flow is interrupted during the hold period, it is desirable to minimize that period. Conventional hold-and-sniff protocols, however, generally utilize a fixed period.

SUMMARY

Various embodiments of the present invention relate to efficient and reliable communication of beacons among neighboring nodes in a wireless network. In particular, instead of having each node transmit beacons over its operational channel and switch to a different channel to receive its one-hop neighbors' beacons, nodes transmit beacons over a different channel (i.e., different from the operational channel) and receive beacons over their operational channels. These outgoing "visitor beacons" may contain the usual beacon information but most importantly specify the operating channel of the transmitting node over which conventional beacons may be transmitted and received. In many cases, the fact that a beacon-transmitting node switches channels while a beacon-receiving node communicates over its regular channel helps reduce the overall time during which nodes are not available on their regular channels.

Accordingly, in one aspect, the invention pertains to a method of efficient beacon communication in a wireless network including multiple nodes, each supporting communication over multiple distinct channels including at least one operational channel for receiving and transmitting data traffic to and from other nodes. In various embodiments, the method includes, for each node, (a) transmitting conventional beacons over the operational channel, the conventional beacons reaching one-hop neighboring nodes having operational channels matching the operational channel of the node; and (b) transmitting, by the node, visitor beacons to all other neighboring nodes over one or more channels, different from the operational channel of the node, the visitor beacons specifying the operational channel of the node, whereby each of the other neighboring nodes receives conventional beacons from the node over a secondary channel matching the operational channel of the node, the secondary channel being different from the one or more channels utilized to transmit the visitor beacons.

In some embodiments, a conventional beacon transmitted by a node includes data specifying capabilities of the node and neighboring nodes. In addition, the conventional beacon may also include data specifying an internal representation of the network or portion thereof. Further, the visitor beacon may also include data specifying capabilities of the node and neighboring nodes. In one embodiment, the operational channel of the node is inactive in step (b). In various embodiments, each node is also configured to operate in a hold-and-sniff mode whereby the node signals its associated parent node in the wireless network to cease, for a defined interval, transmission over the operational channel of the node; the node receives the beacons from one or more one-hop neighboring nodes in the wireless network over one or more tertiary channels thereof during the defined interval, the one or more tertiary channels being different from the operational channels of the node. In addition, the operational channel of the node may be inactive when the node is receiving the beacons over the one or more tertiary channels.

In another aspect, the invention relates to a node for communicating over a wireless network; the node includes at least one radio transceiver for supporting communication over at least one operational. In various embodiments, the node is configured for (a) transmitting conventional beacons over the operational channel, the conventional beacons reaching one-hop neighboring nodes having operational channels matching the operational channel of the node, and (b) transmitting visitor beacons to all other neighboring nodes over one or more channels, different from the operational channel of the node, the visitor beacons specifying the operational channel of the node, whereby each of the other neighboring nodes receives conventional beacons from the node over a secondary channel matching the operational channel of the node, the secondary channel being different from the one or more channels utilized to transmit the visitor beacons.

In some embodiments, a conventional beacon transmitted by the node includes data specifying capabilities of the node and neighboring nodes. In addition, the conventional beacon may also include data specifying an internal representation of the network or portion thereof. Further, the visitor beacon may also include data specifying capabilities of the node and neighboring nodes. In one embodiment, the node is configured such that the operational channel of the node is inactive in step (b). In various embodiments, the node is also configured to operate in a hold-and-sniff mode whereby the node signals its associated parent node in the wireless network to cease, for a defined interval, transmission over the operational channel of the node; the node receives the beacons from one or more one-hop neighboring nodes in the wireless network over one or more tertiary channels thereof during the defined interval, the one or more tertiary channels being different from the operational channels of the node. In addition, the node may be configured such that the operational channel of the node is inactive when the node is receiving the beacons over the one or more tertiary channels.

As used herein, the terms "approximately," "roughly," and "substantially" mean ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
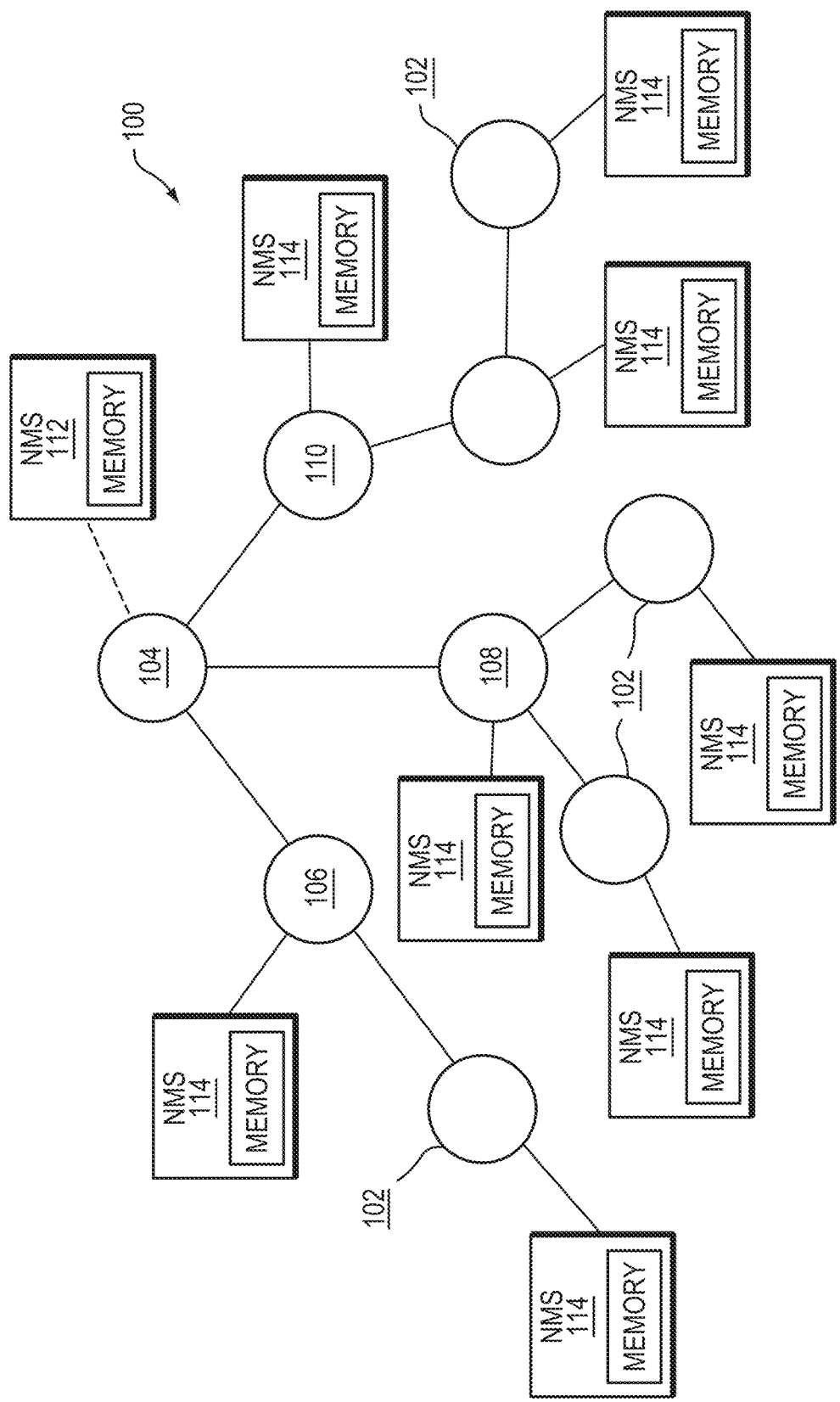
FIG. 1 conceptually illustrates an exemplary tree-based wireless network having multiple network nodes for routing messages in accordance with various embodiments.

FIG. 1 conceptually illustrates an exemplary tree-based wireless network 100 comprising multiple network nodes 102, each including one parent node and one child node, for routing of messages across the network 100. Each network node 102 is a member of a "cell," i.e., a discrete geographic region having fixed-location transceivers on, for example, lighting poles. A cell typically includes a "parent" node (e.g., node 104) and one or more child nodes (e.g., nodes 106-110). In addition, each parent and child contained within a node may include one transceiver. The parent node is the "owner" of the cell node(s); a child node may be associated with only one parent node at a time. In one embodiment, the child nodes connect to their parent nodes via a "wireless tree branch." The child node(s) in a cell are within the radio transmission range of the parent node and vice versa. Typically, the parent node and its child nodes are within a one-hop distance from each other. In each cell, a data packet can be delivered in a "downlinked" manner—i.e., from the parent node to its child node(s) (e.g., using broadcasting to all child nodes or unicasting to a specific child node) and/or in an "uplinked" manner—i.e., from a child node to its associated parent node using, for example, unicasting. If the data packet received by the child node does not originate from its associated parent node, the child node may discard the data packet. Similarly, if the data packet received by the parent node does not originate from one of its associated child nodes, the parent node may discard the data packet.

In various embodiments, each node acts as both a parent node (defined herein as "DL") and a child node (defined herein as "UL"). The DL node is an entity contained in a node that acts as a cell parent; and the other cell members are child nodes of the parent node located one hop away from the DL node. Similarly, the UL node is an entity contained in a node and is a cell member "owned" by a DL parent in another node (e.g., one-hop distance away that acts as the parent).

The tree-based wireless network 100 may be constructed dynamically using one or more conventional protocols and algorithms. In one embodiment, the network 100 is constructed as a spanning tree that interconnects each network node via a unique path to the tree root node. The same path may connect the tree root node to a network node. In some embodiments, the network 100 is constructed as multiple spanning trees with appropriate identifiers per tree; each tree (and thereby its associated identifier) supports a unique path between the tree root node and a network node on that tree. Thus, a downlink data packet that "originates" from the tree root node (or a network management system) may traverse a path across the tree that includes a collection of the network nodes wirelessly interconnected from the parent node of one network node to a child node within the parent's cell (i.e., one hop away). The destination network node can be reached via multiple hops. For a given tree, the path from the root node to the target node is always the same; in other words, the path acts as a "virtual circuit" for a data packets to be delivered from the root node to a target node. The virtual circuit may maintain the in-order delivery of packets, but does not guarantee that all delivered packets will reach the destination. It should be noted that because the path is created dynamically, the path may change while payload packets are in transit. As a result, the packets may arrive out of sequence. When this occurs, a transport protocol (e.g. TCP/IP) may be implemented to handle such out-of-sequence received packets and organize them to an application in the proper sequence. Similarly, an uplink message may be delivered from a node to the root node via traversing a path therebetween. For example, assuming that nodes X, Y, Z are along the path from the node originating the message to the tree root node, the message may propagate in the uplink manner along the wireless branches—i.e., from the originating node UL (e.g., a child contained within node X) to its associated DL (e.g., the parent contained within node Y), then internally propagate from the receiving DL to the UL contained within the same node (e.g., node Y), then propagate further up to the DL (e.g., contained within node Z) associated with the UL within node Y, and so on.

Figure 2:
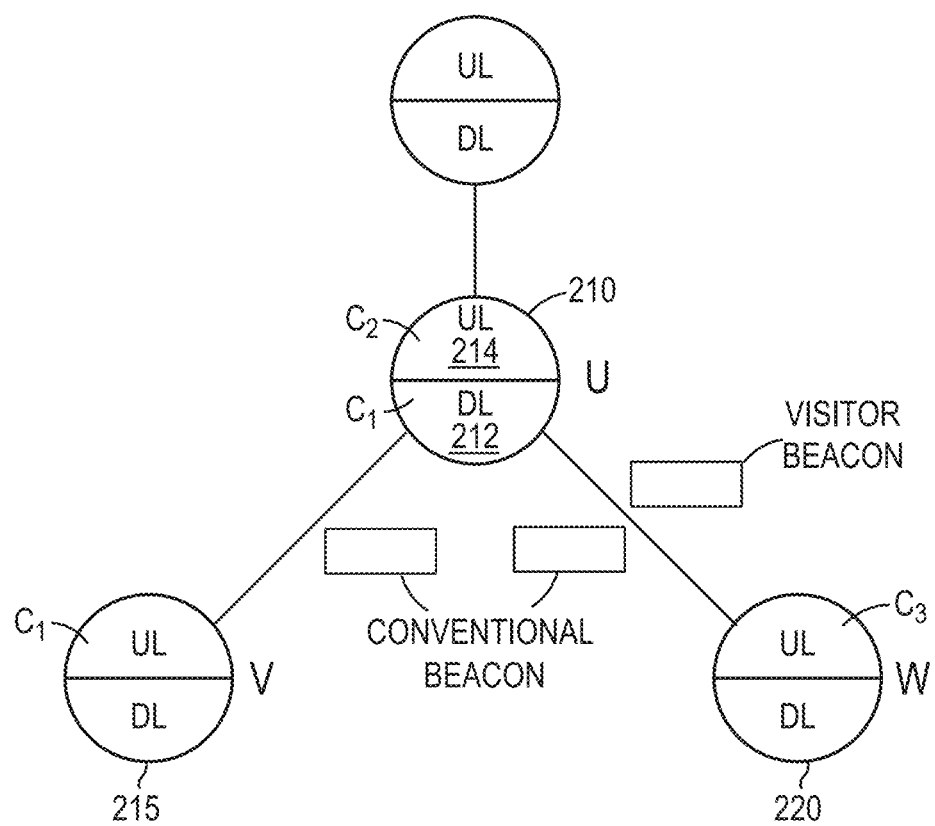
FIG. 2 illustrates a plurality of network nodes configured for operation in accordance with embodiments of the invention.

In various embodiments, each node contains one or more radio transceivers. FIG. 2 illustrates nodes configured for traditional beacon operation and operation in accordance with embodiments of the present invention. A first node U (indicated at 210) includes a parent node portion, DL, 212 and a child node portion, UL, 214; the DL and UL have operational channels C1 and C2, respectively, for transmitting and receiving data packets to and from other nodes in the network. In this embodiment, each of the channels C1 and C2 may be served by a separate transceiver. Alternatively, both UL 212 and DL 214 of the node U may share one operational channel; as a result, only one transceiver may be equipped with the node U. Assume that there are two one-hop nodes V and W (indicated at 215, 220, respectively) neighboring the node U, and nodes V and W use channels C1 and C3, respectively, as their UL operational channels. Beacons transmitted by node U will always be received by node V, since both the DL in the node U and the UL in the node V use the same operational channel C1—that is, node V is always "listening" to node U. But because the operational channel of the DL in node U is different from the operational channel of the UL in node W, beacons transmitted by node U will not be received by node W. To solve this problem, in one embodiment, the DL 212 in node U transmits a "visitor beacon" on the operational channel C3 associated with the UL of node W; this way node W can then listen for beacons from node U over its regular operational channel C3 without switching to a different channel. As a result, both nodes V and W can receive beacons (for node V) or visitor beacons (for node W) over their regular operational channels C1 and C3, respectively, without the need of switching to different channels. This may significantly reduce the overall time during which nodes V and W are not available on their regular operational channels using conventional approaches. It should be noted that in a dense network, there may be tens or hundreds of nodes that are one-hop away from the node U and these neighboring nodes may have different operation channels. To transmit visitor beacons to all these nodes, in one embodiment, the DL portion of node U can transmit the visitor beacons on all channels in the network system, except its operational channel C1.

This visitor-beacon scheme may be compared with the hold-and-sniff scheme as follows. As noted, the hold-and-sniff scheme requires the sniffing node to pause activity on its operational channel and request that neighboring nodes also pause their conventional traffic directed at the "sniffing" node; the pause defines the duration of the sniff. Generally, the sniffing duration is quite long as it has to allow reception of at least one beacon message; this is particularly so when the beacon periodicity is low. On the other hand, the transmitter of a visitor beacon pauses activity on its operational channel only for the time it takes to transmit a visitor beacon, which can involve much less time than a sniff.

Let $BT_{interval}$ be the time interval between beacons and let $BT_{length}$ be the transmission time of an individual beacon. To minimize consumption of network bandwidth by beacon traffic, $BT_{interval}$ should be maximized. Assume that when the visitor-beacon scheme is used, a node transmits visitor beacons over k channels and that $BT_{length}$ for each visitor beacon is t seconds. The time t is the sum of the average channel access duration using the relevant channel access scheme (e.g., the commonly used CSMA/CA protocol), plus the time required for radio tuning to another channel, plus the actual time needed to transmit the packets corresponding to a visitor beacon. Thus, the total time required to deliver visitor beacons on all channels is k×t, meaning that the normal activity of the beacon sender is interrupted for visitor beacon delivery for a duration of k×t seconds. Note that the duration t is affected by the channel load—in fact, exponentially increasing as a function of the channel load.

In hold-and-sniff scheme, the network nodes are not synchronized and beacons may be delivered by each node at any time as determined by a beacon-transmitting node. Each node sniffs for a duration the order of $BT_{length}+BT_{interval}$ to receive at least one beacon from each announcing node in the vicinity. Again assuming k channels in total, each node needs to switch its receiver through k channels and sniff each of them independently, so the total time spent by each node for a round of sniffing is equals to $k \times (BT_{length}+BT_{interval})$. A comparative ratio R may be defined as the ratio of the hold time for sniffing all channels to the hold time for delivery of visitor beacons over all channels, which is equal to $$\frac{BT_{length}+BT_{interval}}{t}$$

For example, if $BT_{length}+BT_{interval}$ is on the order of 1 second, and the time required for delivery of each visitor Beacon is in the order of 20 milliseconds, R=1000/20=50, which demonstrates that the visitor-beacon scheme is more efficient since it interrupts normal node traffic for a shorter time duration. It is possible to reduce the ratio R by, for example, decreasing $BT_{length}$ or adding beacon-related information to each normally delivered data message, thereby avoiding the sniffing time but increasing wasted network bandwidth due to increased data message overhead). Even with these ameliorations, the visitor-beacon scheme requires fewer interruptions.

The "cost" of the visitor-beacon scheme is the increased channel overhead due to the additional delivery of visitor beacons by every node. Each receiving node is affected by this increased load, and the load per receiving node varies as a function of the network topology and radio propagation. Assuming N nodes are within radio distance of a receiving node, and assuming that each node delivers one visitor beacon per visitor beacon interval, the added load on the channel used by the receiving node is $$\frac{N \text{ packets}}{BT_{interval}}.$$

If N is large, this is a non-negligible load.

To reduce the channel load due to visitor beacons, the rate of visitor beacon delivery may be dynamically adjusted according to, for example, the following algorithm. When a node has to a visitor beacon to deliver, it delivers it with probability 1−p, where p is a function of the channel utilization, for example, p=channel utilization (so that the higher the channel utilization, or channel load, the lower the probability of delivery). Assuming a beacon interval of $BT_{interval}$, the total number of beacons plus visitor beacons that are delivered during a beacon interval is 1+N×p, a "self-adjusting" load that varies with N and p. It is noted that in order to estimate the channel load, a node must tune to the channel. It is reasonable to assume that the duration required for channel load measurement is short, but this duration nonetheless adds to the total duration t required for delivery of each visitor beacon and hence affects the ratio R. For a system with a given number of channels, as the network density (i.e., N) increases, the channel load imposed by visitor beacons increases as well, whereas for a system that uses the hold-and-sniff scheme, the channel load imposed by beacon delivery remains constant and is a function only of the beacon Interval $BT_{interval}$ and the number of channels k.

It is possible to combine both the visitor-beacon and hold-and-sniff schemes. Both require tuning to a different channel, either for beacon sniffing or for transmission of visitor beacons, and both require a node to stop its normal activity and switch to another channel in order to receive (in the case of sniffing) or transmit (in the case of visitor beacons). The optimal ratio between the two schemes may be determined in advance or dynamically based on network performance.

One example of mixed usage is as follows. A visitor beacon is first transmitted by each node to all other nodes within radio distance, thereby publishing each node's capabilities to its neighbors. Once all nodes have been apprised of the capabilities of their neighbors, each node can, based on the received visitor beacons, filter out nodes with which it cannot communicate. Each receiving node thereupon checks the quality of the radio channel used to receive visitor beacons. In order to do this, a receiving node applies "sniff" procedure on the channel used to receive visitor beacons, monitoring received beacons (and optionally data traffic) delivered on the sniffed channel. The sniff duration per node and channel combination can be very short since the sniffing node can use for its quality analysis any data packet delivered on the sniffed channel. The sniffing node is only interested in the quality of the radio link between it and the node that is sniffed. At worst, if the sniffed node does not deliver any data packets, at least it will deliver beacons, so the longest required sniffing duration is on the order of $BT_{length}+BT_{interval}$ per sniffed channel and node combination. Following the sniff and quality analysis, the sniffing node has all the requisite information about the node that transmitted the visitor beacon as well as the actual radio channel quality between the measuring node and the node that transmitted the visitor beacon.

Programming to implement the functions associated with channel switching and visitor node generation and transmission may have the form of one or more modules implemented in hardware, software, or a combination of both. For embodiments in which the functions are provided as one or more software programs, the programs may be written in any of a number of high level languages such as PYTHON, FORTRAN, PASCAL, JAVA, C, C++, C#, BASIC, various scripting languages, and/or HTML. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of efficient beacon communication in a wireless network comprising a plurality of nodes each supporting communication over a plurality of distinct channels including at least one operational channel for receiving and transmitting data traffic to and from other nodes, the method comprising:
    (a) transmitting, by a node, conventional beacons over the operational channel, the conventional beacons reaching one-hop neighboring nodes having operational channels matching the operational channel of the node; and
    (b) transmitting, by the node, visitor beacons to all other neighboring nodes over one or more channels, different from the operational channel of the node, the visitor beacons specifying the operational channel of the node, whereby each of the other neighboring nodes receives conventional beacons from the node over a secondary channel matching the operational channel of the node without changing the operational channel of the node, the secondary channel being different from the one or more channels utilized to transmit the visitor beacons.

2. The method of claim 1, wherein a conventional beacon transmitted by a node comprises data specifying capabilities of the node and neighboring nodes.

3. The method of claim 1, wherein the conventional beacon also comprises data specifying an internal representation of the network or portion thereof.

4. The method of claim 1, wherein the visitor beacon also comprises data specifying capabilities of the node and neighboring nodes.

5. The method of claim 1, wherein the operational channel of the node is inactive when transmitting, by the node, the visitor beacons to all other neighboring nodes over the one or more channels.

6. The method of claim 1, wherein each node is also configured to operate in a hold-and-sniff mode whereby the node signals its associated parent node in the wireless network to cease, for a defined interval, transmission over the operational channel of the node, the node receiving the beacons from one or more one-hop neighboring nodes in the wireless network over one or more tertiary channels thereof during the defined interval, the one or more tertiary channels being different from the operational channels of the node.

7. The method of claim 6, wherein the operational channel of the node is inactive when the node is receiving the beacons over the one or more tertiary channels.

8. A node for communicating over a wireless network, the node comprising at least one radio transceiver for supporting communication over at least one operational, the node comprising a memory for storing instructions and a processor for executing the instructions, the processor being configured for:
    (a) transmitting, by the node, conventional beacons over the operational channel, the conventional beacons reaching one-hop neighboring nodes having operational channels matching the operational channel of the node, and
    (b) transmitting, by the node, visitor beacons to all other neighboring nodes over one or more channels, different from the operational channel of the node, the visitor beacons specifying the operational channel of the node, whereby each of the other neighboring nodes receives conventional beacons from the node over a secondary channel matching the operational channel of the node without changing the operational channel of the node, the secondary channel being different from the one or more channels utilized to transmit the visitor beacons.

9. The network node of claim 8, wherein a conventional beacon transmitted by the node comprises data specifying capabilities of the node and neighboring nodes.

10. The network node of claim 8, wherein the conventional beacon also comprises data specifying an internal representation of the network or portion thereof.

11. The network node of claim 8, wherein the visitor beacon also comprises data specifying capabilities of the node and neighboring nodes.

12. The network node of claim 8, wherein the node is configured such that the operational channel of the node is inactive when transmitting, by the node, the visitor beacons to all other neighboring nodes over the one or more channels.

13. The network node of claim 8, wherein the node is also configured to operate in a hold-and-sniff mode whereby the node signals its associated parent node in the wireless network to cease, for a defined interval, transmission over the operational channel of the node, the node receiving the beacons from one or more one-hop neighboring nodes in the wireless network over one or more tertiary channels thereof during the defined interval, the one or more tertiary channels being different from the operational channels of the node.

14. The network node of claim 13, wherein the node is configured such that the operational channel of the node is inactive when the node is receiving the beacons over the one or more tertiary channels.

* * * * *